United States Patent [19]

Winkel et al.

[11] Patent Number: 4,863,009
[45] Date of Patent: Sep. 5, 1989

[54] CONTROL SYSTEM FOR AN ENDLESS BELT CONVEYOR TRAIN

[75] Inventors: Gordon R. Winkel, Fort McMurray; David K. Lamb, Edmonton, both of Canada

[73] Assignees: Alberta Energy Company Ltd., Canada; Canadian Occidental Petroleum Ltd.; Esso Resources Canada Limited, all of Calgary; Gulf Canada Resources Limited, Toronto; Her Majesty the Queen in right of the Province of Alberta as represented by the Minister of Energy and Natural Resources, Edmonton; HBOG-Oil Sands Limited Partership, Calgary; Pan Canadian Petroleum Limited, Calgary; Petro-Canada Inc., Calgary, all of Canada

[21] Appl. No.: 270,733

[22] Filed: Nov. 14, 1988

[51] Int. Cl.$^4$ .................................................. G01G 11/08
[52] U.S. Cl. .................................... 198/505; 198/572; 222/77; 177/50
[58] Field of Search .................. 198/504, 505, 572; 324/158 MG; 177/50; 222/55, 77, 415

[56] References Cited

U.S. PATENT DOCUMENTS

| | | | |
|---|---|---|---|
| 2,664,286 | 12/1953 | Frazel | 198/505 X |
| 2,889,030 | 6/1959 | Mattet | 198/505 |
| 3,139,217 | 6/1964 | Mell | 198/505 X |
| 3,494,507 | 2/1970 | Ricciardi | 198/505 X |
| 3,942,625 | 3/1976 | Snead | 198/505 |
| 4,248,337 | 2/1981 | Zimmer | 198/505 X |

FOREIGN PATENT DOCUMENTS 1048691  1/1959  Fed. Rep. of Germany ...... 198/505

Primary Examiner—Robert J. Spar
Assistant Examiner—Cheryl L. Gastineau
Attorney, Agent, or Firm—Ernest Peter Johnson

[57] ABSTRACT

A system is provided for controlling the feed rate of material being loaded onto a conveyor train of variable configuration to prevent overloading. The system involves monitoring the power drawn by the various drive motors of the train to establish which is the limiting conveyor under prevailing operating conditions. The instantaneous weight of feed material loaded onto the conveyor train, at its input end, is continuously measured and the current average feed rate is computed from the instantaneous weights measured over a pre-set time interval. A rolling average of the total load to be carried by the limiting conveyor downstream is computed from the average feed rate, taking into account the length of the limiting conveyor. The feed rate is then adjusted in response to the computed rolling average to thereby avoid overloading the limiting conveyor and optimize loading of the conveyor train.

3 Claims, 5 Drawing Sheets

TIME (MINUTES)

CONTROL SYSTEM FOR AN ENDLESS BELT CONVEYOR TRAIN

FIELD OF THE INVENTION

The invention relates generally to a system for controlling the loading of feed material onto an endless belt conveyor train.

BACKGROUND OF THE INVENTION

The present invention has been developed in connection with a conveyor train used to transport oil sand from a mine site to a hydrocarbon extraction plant. It will now be described in connection with that application, however the system can easily be adapted for use in other circumstances. It is to be understood, therefore that the invention is not to be considered limited solely to the application described herein.

Typically, a conveyor train system comprises a number of endless belt conveyors, hereinafter termed 'conveyors', serially arranged whereby the output load from one conveyor is transferred as the input load to the next conveyor in the train. Each conveyor, however, comprises a discrete unit.

The individual conveyor comprises lengths of flexible belts spliced together end to end to form the endless belt. In high capacity systems, each such belt is commonly formed of upper and lower rubber layers having reinforcing steel cords sandwiched therebetween. The belt is supported on a plurality of spaced, cushioned, anti-friction idlers. One or more driven pulleys is provided at the conveyor end for driving the belt. The driving pulleys are normally powered by conventional electrical motors. Additional drive motors may be included, if required to cope with variations in load. Tension means are incorporated to keep the belt taut.

For a system comprising belts of fixed length, it is common practice to run the conveyor train in a manner such that each conveyor draws the same percentage of its total rated power.

Where the load-carrying portion of any one belt can vary however, a major disadvantage in such a system is that overloading of a single conveyor can cause it to stall. When this occurs, the whole train must be brought to a halt. Restarting the train is difficult due to the great power needed to get the loaded conveyors under way again. Frequent stalling and restarting reduces productivity and increases equipment wear.

In applicants' commercial open-pit oil sand mining operation, carried out in the Fort McMurray region of Alberta, about 300,000 tonnes per day of oil sand is mined and conveyed to the extraction plant. This operation is illustrated schematically in FIG. 2. Mining is carried out using large draglines which excavate the oil sand to a depth in the order of 40 metres. The draglines deposit the oil sand in elongate windrows along the edge of the rectangular pit. A bucketwheel reclaimer transfers the oil sand from each windrow to a bridging conveyor, which feeds it onto the first conveyor of a train. As shown in FIG. 1, the train to the stacker may consist of 2 to 4 conveyors extending around the perimeter of the pit. In applicants' case, there are 4 draglines in use, each supplying a separate train. The trains all terminate at a common zone adjacent the extraction plant. Here the load from each train is transported by an inclined conveyor (or 'stacker') and deposited on an arcuate stack of oil sand. The extraction plant draws its feed from these 4 stacks.

It will be noted:

that the bucketwheel reclaimer works its way along the length of the windrow and thus the point, at which its bridging conveyor deposits the oil sand onto the first conveyor of the train, varies;

that the bucketwheel reclaimer deposits the oil sand in discrete spaced bucket loads on the transfer conveyor; and that the various conveyors of a train vary in length. Exemplary lengths may range from 150 to 2500 meters.

Stated otherwise, the weight of the feed is not distributed uniformly along the conveyors and the loadbearing length of the conveyors in a train is also not uniform.

It is a requirement of the train concept that the velocity at which the various conveyors travel should be the same. So any resistance to motion will automatically require that the power drawn by the drive motors be increased, so as to maintain a constant belt speed. There exists a maximum safe level of electrical power that can be drawn from each motor without causing it to stall. One seeks always to optimize the loading of conveyors by running them at their maximum safe rated power draw. This is a power draw somewhat below the maximum (stall) power level. Maximum safe rated power correlates with the upper limit of the load that can be carried by the conveyor.

However, it is not difficult to inadvertently exceed this rating.

Conveyor power draw will fluctuate depending upon a number of factors. For example, the internal frictional losses associated with the conveyors are subject to numerous variations. Additionally, external factors such as fluctuations in ambient temperature or differences in the properties or grade of the oil sand per se will give rise to variations in power draw requirements. Expanding further on this latter point, the adhesive properties of the oil sand vary with its grade. If the oil sand is sticky, it will build up on the belt. This is turn affects the drag characteristics of the belt and hence the power draw. Or there may be density variations due to snow or rainfall pickup, which will alter the weight and adhesivity of the load. It is to be emphasized that the power draw fluctuations caused by the above factors are not insignificant.

However, the single predominant factor leading to rapid alternations in the power draw requirements resides in the inherent inconsistency and intermittent nature of the bucketwheel loading technique itself.

In using a bucketwheel reclaimer for loading the bridging or first conveyor of the train, the operator has only his experience and visual observation to guide him as to the rate at which the feed material should be deposited on the conveyor.

When the system was first put into use, the only method of control was full on/full off. An observer in the control tower at the systems delivery end simply radiosignalled that the bucketwheel reclaimer should start or stop adding feed to the first belt of the system.

In order to assist the reclaimer operator to more accurately gauge the optimum conveyor loading rate, a prior art control system was utilized. This method involved attaching wattage meters to the conveyor drive pulley motors and monitoring the power draw requirements thereof. An operator, located in a control tower positioned at the output end of the conveyor train monitored the wattage draw signals and instructed the reclaimer operator to either reduce or increase the feed rate depending upon whether an overload or reduced power draw was observed.

However, this prior art method allows of only crude control. The method fails to take into account the following:

The irregularity and intermittent nature of the rate of loading the feed from the individual buckets of the wheel;

the time lag between the actual loading of the feed material onto the belt, its transportation along the conveyor train, and the relaying of the feedback message to adjust the loading rate accordingly (this time lag may be of the order of twelve minutes);

the variation of effective length of the first conveyor actually in use. This length will change depending upon the position of the reclaimer as it moves along the windrow; and the combined effects of irregular feed rate and power draw fluctuations on the optimum load each individual conveyor can carry.

It is to be noted that, in the present instance, the feed point of the system varies according to where, in the mine, the oil sand is loaded onto the system. As well, belt lengths are changed as the system is expanded to accommodate an increase in the size of the pit. The conveyor system is thus dynamic and variable. This differs from a static system where the feed point and belt lengths are fixed.

There exists, therefore, the need for a control system functional to adopt itself to systematic fluctuations and to optimize the load carried by the conveyor train whilst not exceeding permissible rated power draw for the drive motors.

SUMMARY OF THE INVENTION

The present invention was based on the recognition that:

In every conveyor train, there exists a limiting conveyor. That is to say, there is one conveyor in the train which approaches its maximum power draw requirements more closely than do any of the remaining conveyors. This conveyor is referred to herein as the 'limiting conveyor'. As conditions change, the conveyor in the train, which is the limiting conveyor, can change (that is, at one point in time the limiting conveyor may be the first conveyor—at another point, it may be the third conveyor);

It is necessary to identify the limiting conveyor and to provide means for continuously monitoring the power draw thereof to ensure that overloading is avoided;

Instantaneous weight readings of the feed material being loaded onto the conveyor have to be averaged out over pre-determined time periods, in order to provide meaningful data. Due to the irregularity of the deposition of feed material onto the train from the bucketwheel reclaimer, instantaneous weight readings as an indicia of feed rate are valueless. Additionally, the weight of feed has to be measured at the input end of the train, to minimize errors arising from time lags within the system; and A 'rolling average' of the total weight of feed material on the limiting conveyor can be computed in advance. By 'rolling' is means that several data points are averaged and, at fixed intervals, the oldest point is withdrawn from the computation and the most recent added. Thus by computing a 'rolling average' it is possible to predict the total load of feed material which would be carried by any pre-determined section of the train downstream, given the current average feed rate, and hence the current digging rate of the reclaimer. A substantially direct correlation exists between the computed 'rolling average' and the predicted power draw of the limiting conveyor. As a result, a feedback means can then be applied for controlling the feed rate of material onto the train to thereby optimize loading of the system and avoid overloading of the limiting conveyor thereof.

Broadly stated, the invention in an apparatus aspect comprises: first means, associated with each endless belt conveyor drive means, for substantially continuously measuring the power draw by such drive means and producing signals indicative thereof, whereby the conveyor in the train which is the limiting conveyor may be identified; second means, associated with the initial conveyor in the train, for instantaneously measuring the weight of the feed material deposited thereon and producing signals indicative thereof; third means, associated with the weight measuring and signalling means, for computing the average feed rate of material deposited on the initial conveyor over a pre-set period of time, utilizing the instantaneous weight measurements sensed and producing signals indicative thereof; fourth means, associated with the first and third means, for projecting the computed current average feed rate to the total load the limiting conveyor downstream will carry at that feed rate, calculated as a rolling average of the load, and producing signals indicative thereof; and fifth means, associated with the manually operated loading machine, for receiving and displaying the signal produced from the fourth means, whereby the feed rate addition to the first conveyor may be altered in response to the fourth means signals, to thereby control the rate at which feed material is being deposited onto the conveyor train to avoid overloading the limiting conveyor.

In a method aspect, the invention comprises: measuring the individual power draws of the drive means of each conveyor of the train and utilizing said measurements to establish which is the limiting conveyor of the train; substantially continuously measuring the instantaneous weight of feed material being added at the input end of the train and producing signals indicative thereof; averaging, over a pre-set period of time, the rate at which feed is added to the initial conveyor; computing from said weight-added signals a rolling average of the total load on the limiting conveyor; and adjusting the feed rate in response to the computed rolling average to ensure that the limiting conveyor will not be overloaded.

DESCRIPTION OF THE DRAWINGS

FIGS. 4a and 4b exemplify cases where the conveyor is operated using conventional methods. In 4a, output is fairly high (79%) but the rated capacity is often exceeded. In 4b, to keep maximum load at or below the rated capacity, production is reduced (64%). FIG. 4c shows an example of the conveyor being operated using the method of the present invention. In this case, the histogram shows that most events occur at or just below the rated capacity. Production is high (86%) but the system is never overloaded.

DESCRIPTION OF THE PREFERRED EMBODIMENT

Figure 1:
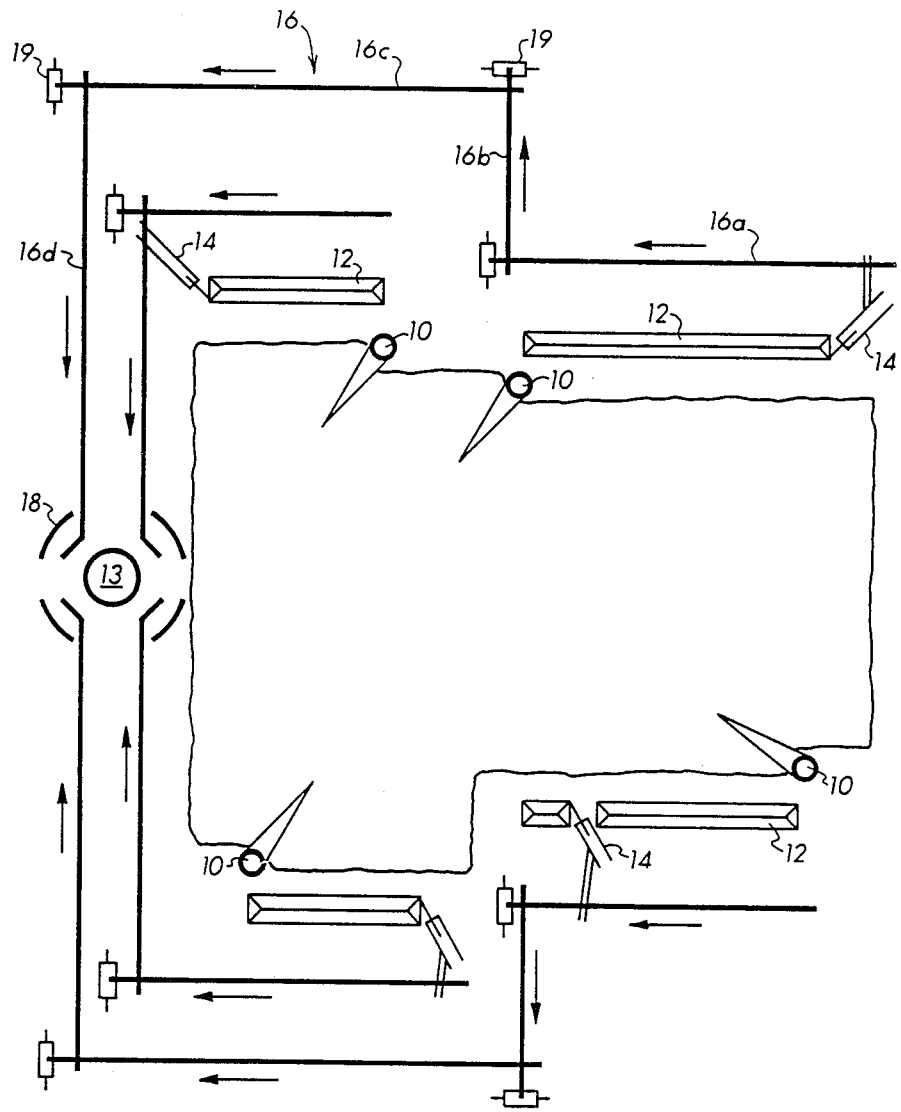
FIG. 1 is a schematic showing the mining equipment used at applicants' open-pit oil sand mine site.

Having reference to FIG. 1, it shows a conventional oil sand mine in which the present invention may be utilized. It should be understood that although the mine system set forth is operated in four essentially equal quadrants, it is described herein particularly with respect to a single quadrant.

More particularly, the mine system comprises a dragline 10 which excavates the oil sand at the pit face to generate a windrow 12. A bucketwheel reclaimer 14 transfers the oil and from windrow 12 onto the endless belt conveyor train 16. Conveyor train 16 carries the oil sand to a stacker which transfers the material onto a stack 18. A control tower 13 is centered within the stacking area. The mined sand is conveyed from the stacking area to the hydrocarbon extraction plant (not shown), The conveyor train 16 shown comprises four conveyors 16a, 16b, 16c, 16d, serially arranged as shown in FIG. 1. Each conveyor was driven by a driven pulley powered by one or more electric motors 19. Typically, the train layout comprises the following:

|  | Length (Meters) | Travel Time (Minutes) | Number of Motor Drives |
| --- | --- | --- | --- |
| Conveyor 16a | 2,500 | 9 | 4 |
| Conveyor 16b | 300 | 1 | 1 |
| Conveyor 16c | 2,500 | 8 | 4 |
| Conveyor 16d | 1,000 | 4 | 3 |

Figure 2:
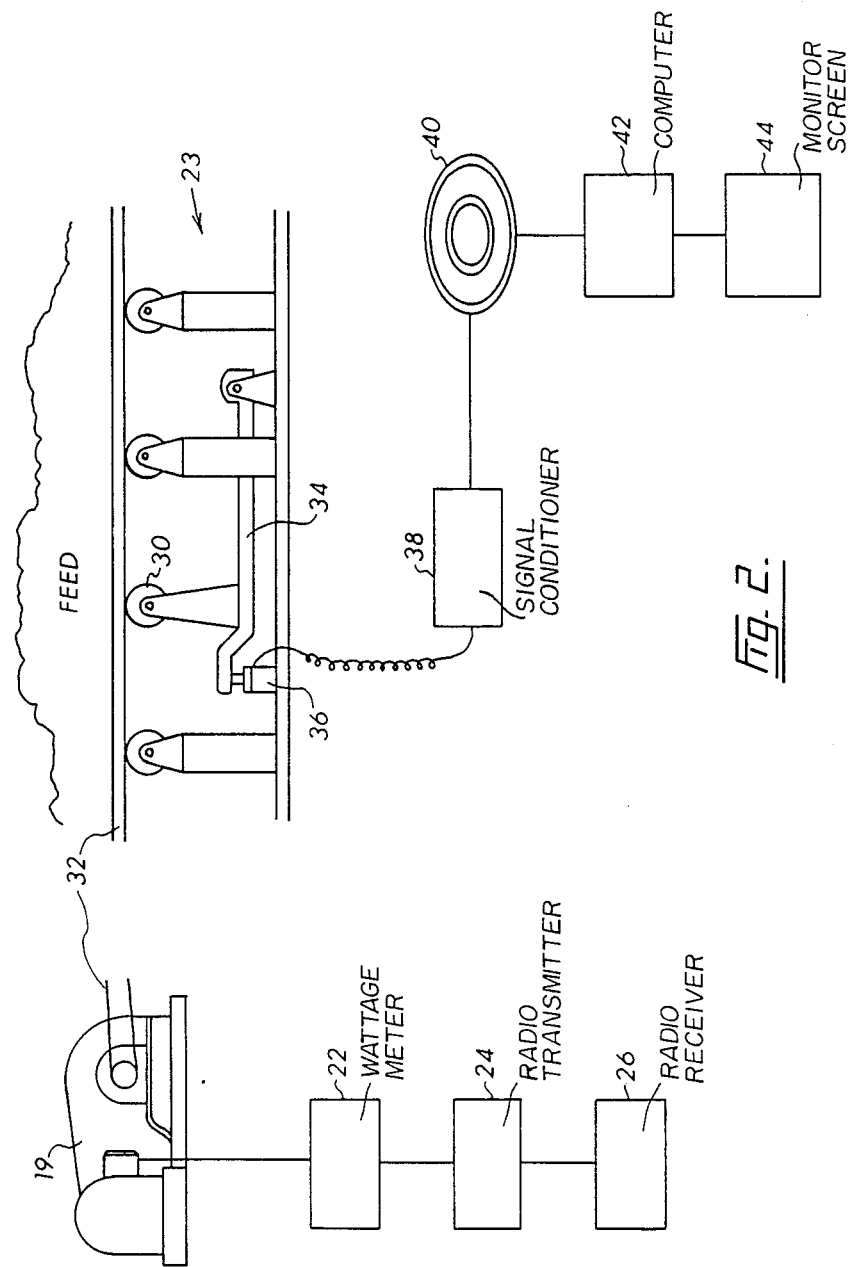
FIG. 2 is a schematic of apparatus employed in the practice of the present invention.

In accordance with the invention, and as shown in FIG. 2, wattage meters 22 were electrically connected to each drive motor 19 (only one of which is illustrated) to monitor the power drawn by each drive system. The wattage meters 22 were conveniently located in the control tower 13. From the tower, a radio transmitter 24 sent a signal indicative of power draw to a radio receiver 26 located in the bucketwheel reclaimer 14. The operator in the bucketwheel reclaimer 14 would instruct a computer as to which conveyor in the pertinent train was the limiting conveyor.

A continuous-sensing weightometer 23 was associated with the bridge conveyor of the bucketwheel reclaimer 14. More particularly, roller 30 was arranged to continuously contact the underside of the belt 32 of the bridge conveyor. A pivoting arm 34 supported the roller 30 and communicated with a load cell 36. As roller 30 moved upwardly and downwardly in response to the amount of material loaded on belt 32, a signal indicative of the weight was transmitted from the load cell 36. The weightometer 23 was constructed by the inventors. Meters serving the same purpose are widely available in commercial form. The load cell was manufactured by Strainsert as model FL7.5U (C)-2SKWT.

A signal conditioner 38 received the output signal transmitted from the load cell 36. Signal conditioner 38 electronically filtered out noise and variables which would influence the true weight readings. It further functioned to amplify the output signal. The signal conditioner 38 used was model TSC 17-1121 option 1 manufactured by Acrotech.

Slip rings 40 were mounted in the bucketwheel reclaimer 14. The amplified signal from the conditioner 38 was passed via slip rings 40 to a computer 42. Attached to computer 42 was a monitor screen 44.

It is to be noted that the computer 42 was "associated" with or operatively interconnected with the wattage meters 22 (through the medium of the reclaimer operator) and with the load cell 36.

Within the internal memory of the computer were two programs which enabled the computer to process the incoming data to provide a feedback arrangement for controlling the rate at which feed was loaded onto the conveyor train and hence for controlling the digging rate.

More particularly, the first program caused the computer to average the instantaneously sensed weight of oil sand loaded onto the bridge conveyor over a predetermined time interval. This produced measure indicative of the average current feed rate.

The second program was adapted to utilize the average current feed rate data and the transit time of the limiting conveyor as the input data, to compute a 'rolling average' of the load on the limiting conveyor. The transit time was determined by dividing the length of the conveyor by its velocity.

Both first and second programs were written utilizing conventional programming steps. Programs of the second type should take account of any variations in belt slope.

Figure 3:
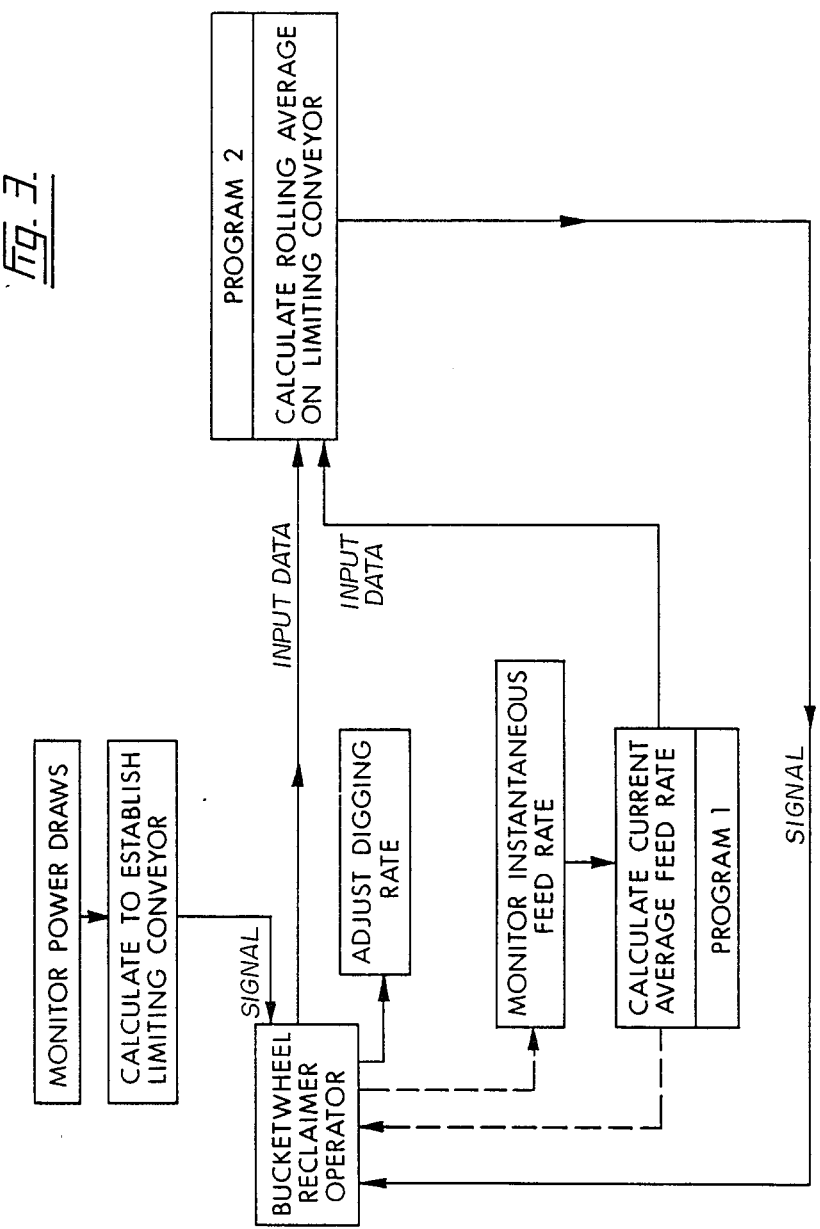
FIG. 3 is a flow chart showing the steps of the method carried out by the apparatus of FIG. 2.
Figure 4A:
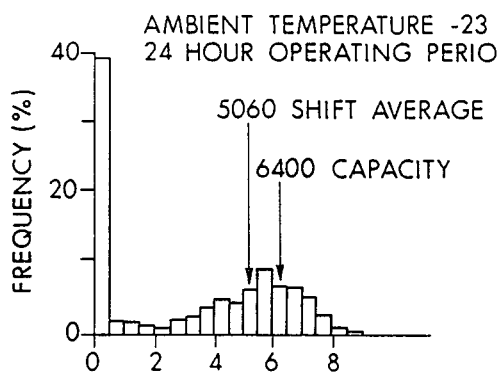
FIG. 4a, 4b and 4c are a series of histograms included to demonstrate the operability of the invention. They show plots of the frequency (% of operating time) versus the conveyor load (kt/h). The rate capacity varies depending on ambient conditions. For the examples of FIGS. 4a and 4c it is 6400 kt/h, and for 4b it is 7300 kt/h.
Figure 4B:
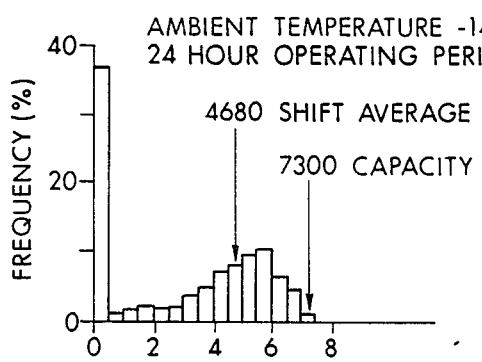
Figure 4C:
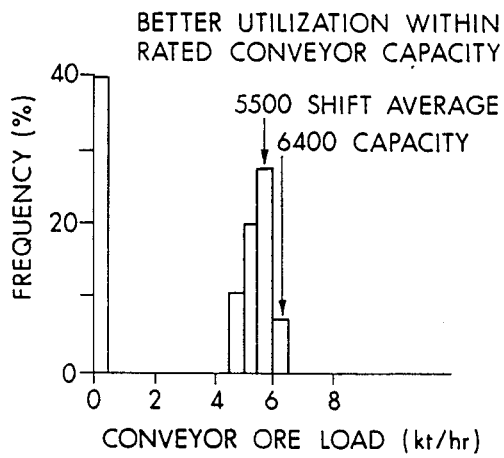
Figure 5A:
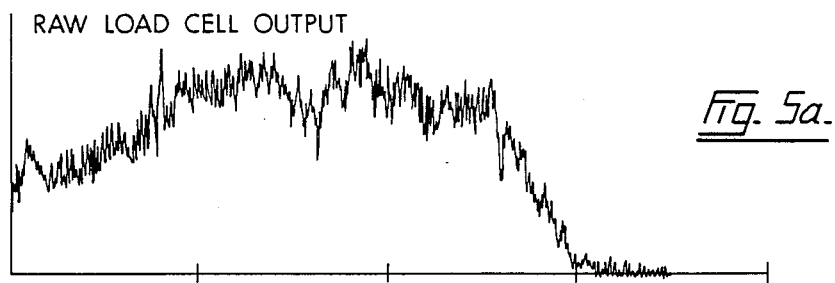
FIG. 5 shows plots of weightometer response versus time as (a) raw load cell output (b) filtered load cell output (c) filtered load cell output averaged over 4 second intervals to eliminate the effect of intermittent feed as it is deposited by individual buckets of the BWR, and (d) is a rolling average produced from the average readings to predict the load that will be carried by the limiting conveyor.
Figure 5B:
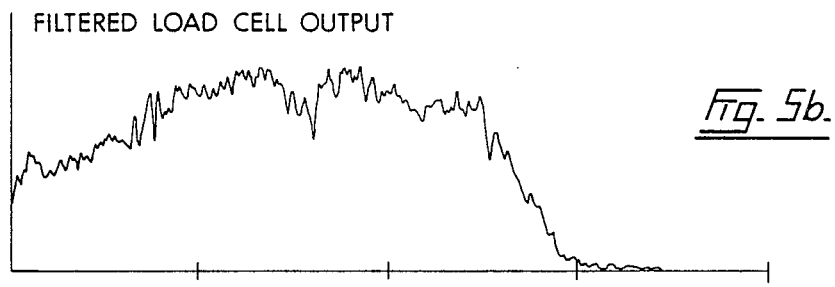
Figure 5C:
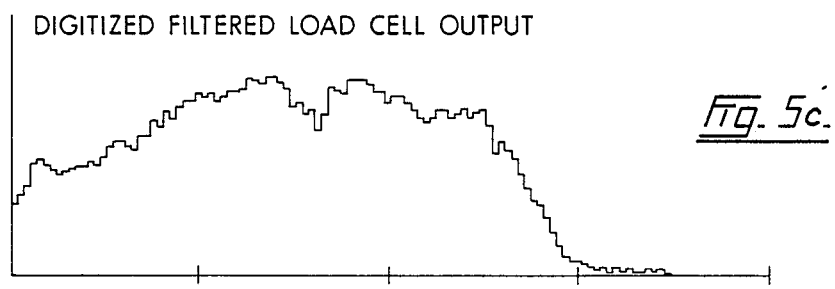
Figure 5D:
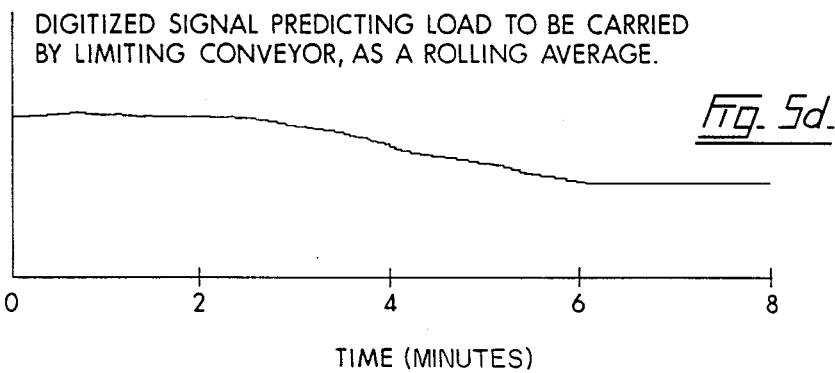

The steps executed are illustrated in FIG. 3. With load added to the system held constant for a length of time required to fill the entire system, the wattages drawn by the drive motors of the individual conveyors of the conveyor train were monitored or measured, using meters 22. The conveyor which drew the highest percentage of the maximum power available from its drive motor(s) 19, was established as the limiting conveyor of the train. The bucketwheel reclaimer operator was advised of the identity of the limiting conveyor. The length of the loaded portion of the limiting conveyor was utilized as input to the second program.

The instantaneous weight of feed material deposited on the bridging conveyor was determined as described hereabove. The current average feed rate was computed utilizing program 1. The computed rate was utilized as input data for program 2.

As stated earlier, the second computer program then computed the projected rolling average of the weight of feed material onto the limiting conveyor from the input data.

The results from the first and second computer programs were displayed to the bucketwheel reclaimer operator. The power draw, monitored in the control tower, indicated whether the limiting conveyor was loaded below capacity. Based on this, the operator was instructed to adjust the digging rate if required. The correctness of the adjustment was determined by the new wattage draw. The adjustment was determined by the effect of a discrete change in digging rate on the load carried by the limiting conveyor as given by the rolling average program.

EXAMPLE OF OPERATION

1. Determine critical conveyor:

BWR operator digs at constant average feed rate until entire conveyor train is loaded at that feed rate. Control tower power meters are examined to identify conveyor which is drawing the highest percent of its allowed power. This is the critical conveyor.

2. Set rolling average period:

Identity of critical conveyor is radioed to BWR operator, who inputs corresponding loaded length to program 2. Computer now displays rolling average of feed on loaded length of critical conveyor.

3. Set desired digging rate:

If power draw is low compared with available power, control tower radios BWR operator to increase digging rate.
or
If power draw is too high or if less feed is required, control tower radios BWR operator to crease digging rate.

BWR operator increases or decreases digging rate (as required) and maintains new average rate until critical conveyor has been loaded at that feed rate.

Control tower radios BWR operator with further corrections as a few iterations may be required.

4. Maintain desired digging rate and conveyor power draw:

The desired digging rate, as determined by step 3 is maintained by the BWR operator keeping a constant rolling average feed rate.

The embodiments of the invention in which an exclusive property or privilege is claimed are defined as follows:

1. In a solid materials transportation system wherein discrete spaced loads of material are intermittently fed by means of a manually operated loading machine onto the first of a plurality of serially arranged individual endless belt conveyors which in combination form a conveyor train moving at a substantially constant velocity and wherein each endless belt conveyor is provided with separate drive means, apparatus for optimizing the load carried by the conveyor train which comprises:
   first means, associated with each endless belt conveyor drive means, for substantially continuously measuring the power drawn by such drive means and producing signals indicative thereof, whereby the conveyor in the train which is the limiting conveyor may be identified;
   second means, associated with the initial conveyor in the train, for instantaneously measuring the weight of the feed material deposited thereon and producing signals indicative thereof;
   third means, associated with the weight measuring and signalling means, for computing the average feed rate of material deposited on the initial conveyor over a pre-set period of time, utilizing the instantaneous weight measurements sensed, and producing signals indicative thereof;
   fourth means, associated with the third means, for projecting the computed current average feed rate to the total load the limiting conveyor downstream will carry at that feed rate, calculated as a rolling average of the load, and producing signals indicative thereof; and
   fifth means, associated with the manually operated loading machine, for receiving and displaying the signal produced from the fourth means, whereby the feed rate addition to the first conveyor may be altered, in response to the fourth means signals, to thereby control the rate at which feed material is being deposited onto the conveyor train to avoid overloading the limiting conveyor.

2. A method for controlling the rate of loading feed material onto a train of individually driven conveyors, to optimize the loading thereof so as to avoid overloading the limiting conveyor of the train, which comprises:
   measuring the individual power draws of the drive means of each conveyor of the train and utilizing said measurements to establish which is the limiting conveyor of the train;
   substantially continuously measuring the instantaneous weight of feed material being added at the input end of the train and producing signals indicative thereof;
   averaging the instantaneous weight measurements over a pre-determined period;
   computing from said weight-added signals a rolling average of the total load on the limiting conveyor; and
   adjusting the feed rate in response to the computed rolling average to ensure that the limiting conveyor will not be overloaded.

3. A method for controlling the rate of loading oil sand with a bucketwheel reclaimer onto a train of individually driven conveyors, to optimize the loading thereof so as to avoid overloading the limiting conveyor of the train, which comprises:
   measuring the individual power draws of the drive means of each conveyor of the train and utilizing said measurements to establish which is the limiting conveyor of the train;
   substantially continuously measuring the instantaneous weight of oil sand being added at the input end of the train and producing signals indicative thereof;
   computing from said weight-added signals the current average feed rate of oil sand being added for a predetermined period;
   utilizing said current average feed rate values to compute a rolling average of the predicted total load on the limiting conveyor, which will occur when oil sand currently being added reaches and loads said limiting conveyor; and
   adjusting the reclaimer feed rate in response to the computed rolling average to ensure that the limiting conveyor will not be overloaded.

* * * * *